United States Patent [19]
Sera et al.

[11] Patent Number: 4,708,613
[45] Date of Patent: Nov. 24, 1987

[54] PLUNGER FOR A MULTI-PLUNGER TYPE RESIN MOLD DEVICE

[75] Inventors: Michitoshi Sera, Yokohama; Mitukazu Watanabe, Noogata; Kiyoshi Aoki, Ayase, all of Japan

[73] Assignee: Kabushiki Kaisha Toshiba, Kawasaki, Japan

[21] Appl. No.: 833,597

[22] Filed: Feb. 27, 1986

[30] Foreign Application Priority Data

Mar. 27, 1985 [JP] Japan ................................. 60-60990
Apr. 26, 1985 [JP] Japan ................................. 60-89043

[51] Int. Cl.⁴ ...................... B29C 45/02; B29C 45/53
[52] U.S. Cl. .................................. 425/117; 425/127; 425/129 R; 425/544
[58] Field of Search ................. 92/215, 220, 223, 255; 425/110, 116, 117, 127, 129 R, 542, 544

[56] References Cited

U.S. PATENT DOCUMENTS

| | | | |
|---|---|---|---|
| 1,326,692 | 12/1919 | Ragatchoff | 92/255 |
| 1,380,397 | 6/1921 | Levedahl | 92/255 |
| 1,504,538 | 8/1924 | Barthel | 92/255 |
| 1,534,225 | 4/1925 | Lemieux | 92/255 |
| 2,220,822 | 11/1940 | Grad | 92/255 |
| 3,163,093 | 12/1964 | Gut | 92/255 |
| 3,911,891 | 10/1975 | Dowell | 92/223 |
| 4,024,802 | 5/1977 | Koppa | 92/255 |
| 4,288,326 | 9/1981 | Keefer | 417/374 |

FOREIGN PATENT DOCUMENTS 2090645 6/1982 United Kingdom .

Primary Examiner—Willard E. Hoag
Attorney, Agent, or Firm—Finnegan, Henderson, Farabow, Garrett & Dunner

[57] ABSTRACT

A plunger is used for a multi-plunger type resin mold device which is adapted to be slidably inserted into a pot to permit a resin in the pot into a mold. The plunger includes a forward end member whose forward end edge portion is formed of silicon nitride, silicon carbide or zirconia, the forward end edge portion of said forward end pot member being in contact with the resin in the pot, and a plunger body to which the forward end member is fixed. The forward end member is fixed to the plunger body by threadably inserting an insertion section of the forward end member into a recess formed in the plunger body.

8 Claims, 13 Drawing Figures

F I G. 11
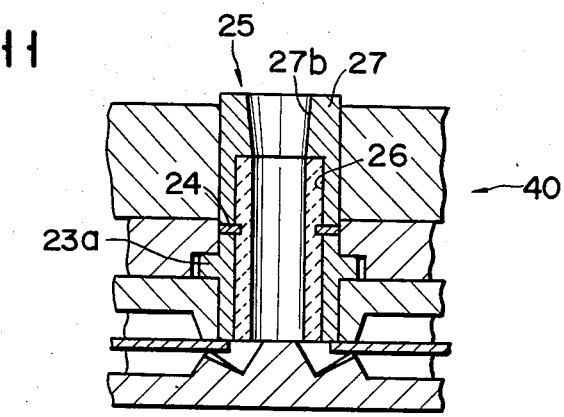
F I G. 12
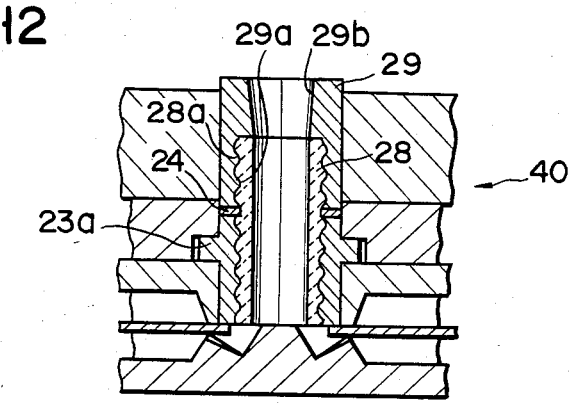
F I G. 13
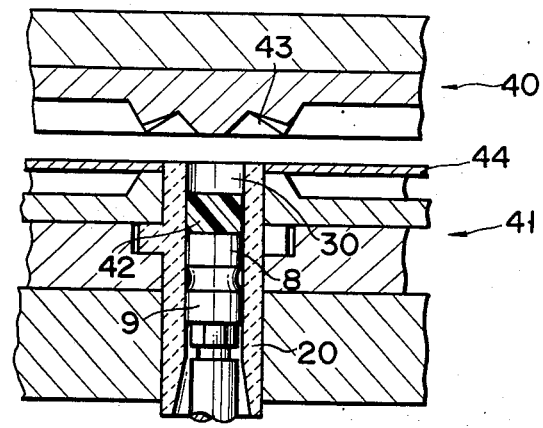

PLUNGER FOR A MULTI-PLUNGER TYPE RESIN MOLD DEVICE

BACKGROUND OF THE INVENTION

This invention relates to a plunger for a multi-plunger type resin mold device slidably insertible into a pot to supply a resin into a mold.

As a transfer mold device for use in the resin encapsulation of electronic components such as semiconductor elements, a single plunger type was usually used, but a multi-plunger type capable of a high-speed molding has recently been adopted in which there is no runner between a pot and a mold cavity.

A conventional resin mold device of a multi-plunger type will be explained below with reference to FIGS. 1 to 3. FIG. 1 is a perspective view showing upper mold half 1; FIG. 2 is a plan view showing lower mold half 2 and FIG. 3 is a cross-sectional view showing the upper and lower mold halves. At the mating surfaces of the upper and lower mold halves 1 and 2 are provided a plurality of culls 3, gates 4 communicating with the culls and mold cavities 5 communicating with the gates 4. A plurality of cylindrical pots 6 are each provided in upper mold half 1 to communicate with the culls. A vertically movable plunger 7 is adapted to be inserted into the pot. The mold cavity has a configuration corresponding to a package of the resin-encapsulation type semiconductor device.

In the molding of the package the upper and lower mold halves are preheated to a temperature (for example, about 180° C.) at which the resin for molding is cured. A lead frame F with a semiconductor chip placed thereon is sandwiched between the upper and lower mold halves such that the side edge portions of the frame extend from the mold cavity as shown in FIG. 3. Then, resin tablet T is inserted through the upper open end of the pot into the inner space thereof as shown in FIG. 1 and, while the resin tablet is molten there, the plunger is lowered into the pot. By the pressure of the plunger 7 the molten resin on the cull is forced past the gates into the corresponding mold cavities 5. After the molten resin has been filled into the mold cavities, the molding device is maintained at that pressure for a predetermined time period and is cured. Thereafter, the plunger pressure is released and the plunger is lifted, followed by opening the mold and taking a molded article integral with the lead frame F out of the mold.

In the aforementioned multi-plunger type resin mold device, since the resin is molded at four and five times as fast a cycle (about 60 seconds/cycle) as that of the single plunger type resin mold device, the plunger is prominently worn out due to a filler contained in the resin. In the aforementioned multi-plunger type resin mold device, therefore, use is made, as the plunger, of a type which is made of a material, such as a quenched die steel, high-speed steel or powdered high-speed steel, whose surface is covered with a hard chromium plating film of about 10 μm in thickness. The use of such material causes a greater wear to occur on the plunger, presenting the following drawbacks as will be set forth below:

(1) A greater clearance is produced between the inner wall of the pot and the outer wall of the plunger due to a greater wear, causing the resin to penetrate into the clearance to increase the frictional resistance of the plunger. As a result, a resin charging pressure in the mold cavity is lowered and a molding defect may occur due to the insufficient filling of the resin and the occurrence of cavities, resulting in a poor yield in the semiconductor devices.

(2) The resin entrapped between the pot and the plunger is peeled as a larger resin scum and deposited onto a sensor etc., within the device. Due to the presence of the resin scum the normal operation of the sensor etc., is prevented, producing a device malfunction and a consequent lower rate of device operation.

(3) It is necessary to frequently exchange plungers in a shorter period of time, for example, seven to fourteen days. This necessitates preparing a greater number of spare plungers. Furthermore, the operation of the plungers must be stopped for each plunger exchange, involving a lower rate of device operation and a high running cost.

In the conventional multi-plunger type resin mold device a lowered rate of production and a resultant lower article yield are involved due to an excessive wear of the plungers, providing a far to a higher production of the semiconductor devices.

SUMMARY OF THE INVENTION

It is an object of this invention to provide a plunger for a multi-plunger type resin mold device which is free from the aforementioned drawbacks and higher in wear resistance than a conventional plunger.

According to this invention there is provided a plunger for a multi-plunger type resin mold device, comprising a forward end member made of at least one kind of material selected from the group consisting of silicon nitride, silicon carbide and zirconia, and a plunger body to which the forward end member is fixed.

BRIEF DESCRIPTION OF THE DRAWINGS

FIGS. 9 to 12, each, show a pot into which the plunger of this embodiment is inserted; and FIG. 13 is a cross-sectional view showing a state in which a pot of FIG. 11 is incorporated into a lower plunger type resin mold device.

DETAILED DESCRIPTION OF THE PREFERRED EMBODIMENTS

The embodiments of this invention will be explained below in more detail with reference to the accompanying drawings.

EMBODIMENT 1

Figure 1:
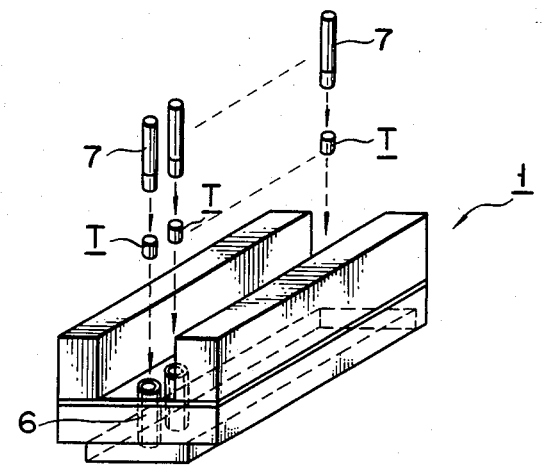
FIG. 1 is a perspective view showing an upper mold half for a conventional multi-plunger type resin mold device.
Figure 2:
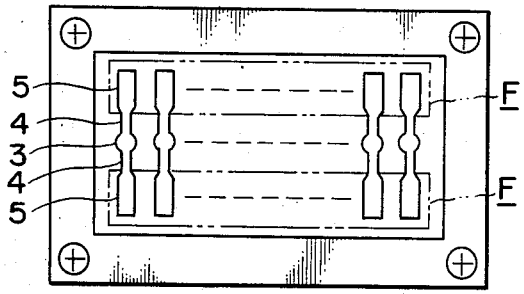
FIG. 2 is a plan view showing a lower mold half for the device of FIG. 1.
Figure 3:
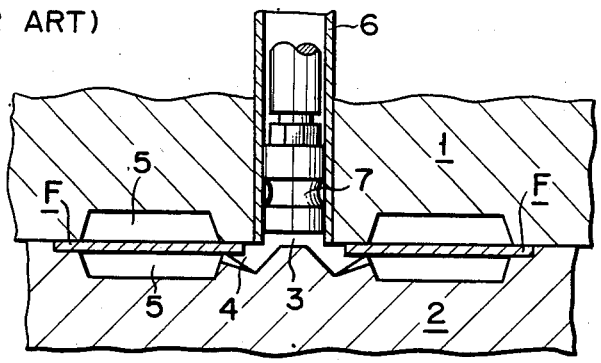
FIG. 3 is a partial, cross-sectional view showing an operation state of the upper and lower mold halves of FIG. 1.
Figure 4:
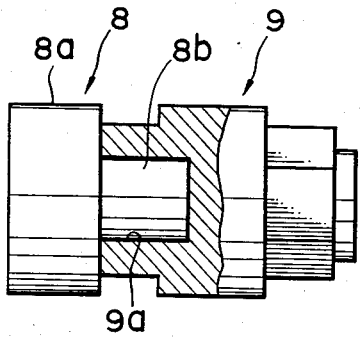
FIGS. 4 to 8, each, are a partial, cross-sectional view in side elevation showing a plunger according to an embodiment of this invention which is used for a multi-plunger type resin mold device.
Figure 5:
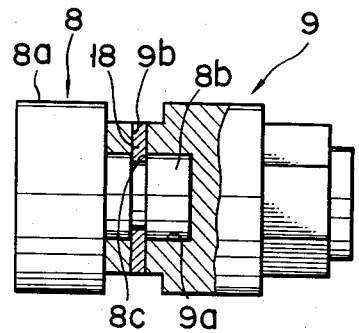
Figure 6:
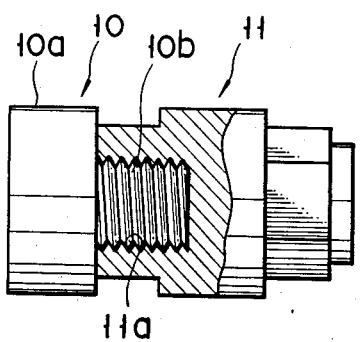
Figure 7:
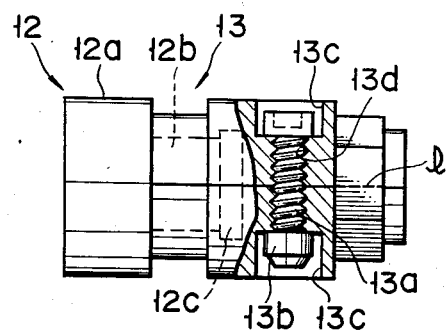

A plunger according to this embodiment comprises, as shown in FIG. 4, forward end member 8 having a configuration of stepped cylinder and formed of silicon nitride, silicon carbide or zirconia and cylindrical plunger body 9 made of a metal. The forward end member 8 comprises large-diameter head 8a defining a plunger head and small-diameter insertion section 8b formed on a side opposite that on which the head is provided. The insertion section of the forward end member is inserted into a hole 9a formed at the forward end portion of the plunger body. The forward end member is attached as one unit to the plunger body, noting that the forward end member 8 is attached to the plunger body by a method, such as a thermal shrinking or press fitting method. The head of member 8a has a smoothed side wall and front face. The forward end edge portion of the head, i.e. an angular area of the head where the end face of the head intersects the inner wall of the pot, is formed of silicon nitride, silicon carbide or zirconia. As shown in FIG. 5, locking pin through hole 9b is formed in a small-diameter section of plunger 9a such that it extends into hole 9a of the plunger in a direction of the diameter of the small-diameter section of the plunger. Locking pin groove 8c is formed in an outer periphery of insertion section 8b of forward end member 8. In this embodiment, the plunger member is firmly attached to the forward end member by inserting locking pin 18 from the outer periphery of the small-diameter section of the plunger through the locking pin hole into the locking pin groove. Since this embodiment uses the locking pin, it can obviate the necessity of using the aforementioned method, such as the thermal shrinking or press fitting method. Table 1 shows the results of a comparison between the plunger of FIG. 5 and the conventional plunger.

situated. The plunger body has internally threaded hole 11a formed at the forward end portion thereof. The forward end member is attached to the plunger body 11 by threadably inserting the externally threaded section of the forward end member into the internally threaded hole of the plunger. In this case, the forward end member is detachably mounted on the plunger body. The forward end member may be nondetachably attached to the plunger body by initially coating the internally threaded hole of the plunger body with a thermosetting resin, inserting the externally threaded section of the forward end member into the internally threaded hole of the plunger body and heating the resin there to permit it to be cured.

EMBODIMENT 3

A plunger according to this embodiment comprises forward end member 12 formed of the same material as embodiments 1 and 2 and plunger body 13 made of a metal. The forward end member 12 comprises large-diameter head section 12a acting as a plunger head and small-diameter shaft section 12b projecting on the side opposite that on which the head section is situated. Over that end portion of the shaft section situated remote from the head section of the member a flange 12c is fitted which has a diameter greater than shaft section 12b of the member. Plunger body 13 has a spacing within a forward end portion thereof where the flange is fitted over the shaft section of the member. The plunger body is bisected, as semicircular sections, along

TABLE 1

| Comparison Item | | Plunger of this Invention Material | | | Conventional Plunger |
|---|---|---|---|---|---|
| | | Silicon Nitride (Si$_3$N$_4$) | Silicon Carbide (SiC) | Zirconia (ZrO) | |
| Amount of Wear ($\mu$m) | After Ten Thousand Shots | 1 | 0.5 | 1.5 | 10~40*1 |
| | After Twenty Thousand Shots | 3 | 1 | 5 | 20~70*2 |
| | After One-Hundred and Twenty Thousand Shots | 20 | 13 | 30 | — |
| Plunger Exchange Cycle (month) | | 6 | 8 | 4 | 0.25~0.5 |
| Yield % | | 99.6 | 99.4 | 99.5 | 92~96 |
| Device Operation Rate % | | 81 | 79 | 80 | 32~49 |
| Running Cost (yen/piece) | | 0.1 below | 0.1 below | 0.1 below | 0.8~0.5 |

*1 the number of prungers left unusable after ten thousand shots.
*2 the number of plungers all unusable after twenty thousand shots.

In Table, the item "running cost" represents a running cost per piece of IC and the item "device operation rate" a ratio of an actual operation time to a whole operation time (not including an initial check time and the other dwell time). Note that, as the conventional plunger, use was made of a type made of a die steel covered with an about 10 $\mu$m-thick hard chromium plating film. According to this embodiment use was made of a plunger whose forward end edge portion is formed with a silicon nitride, silicon carbide or zirconia. As appreciated from the above, the plunger of this embodiment can assure a reduced amount of wear, a much longer exchange cycle, a higher yield and a much lower running cost.

EMBODIMENT 2

A plunger according to this embodiment has forward end member 10 made of the same material as embodiment 1 and plunger body 11 made of a metal. The forward end member 10 comprises large-diameter head section 10a serving as a plunger head and small-diameter, externally-threaded section 10b which is provided on the side opposite that on which the plunger head is a plane including a center line 1. Hole 13d is formed in the plunger body such that it is located perpendicular to that plane. Bolt 13a is inserted into hole 13d with an end thereof projected from the hole 13d, and nut 13b is fitted over that end of the bolt. By tightening the nut relative to the bolt, the semicircular sections of the plunger are connected together whereby the forward end member is attached as one unit to the plunger body 13. The head of the bolt and nut are buried in recesses which are formed at the open opposite end portions of hole 13d. This arrangement prevents the head section of bolt 13a and nut 13b from externally projecting beyond the outer periphery of the plunger body. In this embodiment the forward end member can be attached to the plunger body 13 by merely tightening the nut. It is therefore unnecessary to use the method such as the thermal shrinking method. Thus, the forward end member can be detached from the plunger body as required.

EMBODIMENT 4

Figure 8:
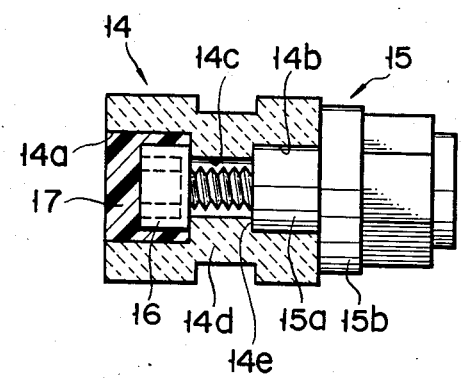

A plunger of this embodiment comprises, as shown in FIG. 8, forward end member 14 made of the same material as in embodiment 1 to 3 and plunger body made of a metal. The forward end member 14 is cylindrical in configuration and has a stepped center hole having a forward open end section 14a and a rear open end section 14b with narrower intermediate hole section 14c defined between the forward and rear open end sections. Step 14d is defined between hole sections 14a and 14c and step 14e is defined between hole sections 14d and 14c. The plunger body 15 has a large-diameter flange 15b larger than the diameter of hole section 14b and small-diameter insertion section 15a ahead of flange 15b. An internally threaded hole is formed at the free end portion of insertion section 15a. Insertion section 15a is inserted into hole section 14b and the forward end face of flange 15b abuts against the rear end face of forward end member 14. Bolt 16 is inserted from the side of hole section 14a into the internally threaded hole of insertion section 15a. The tightening of bolt 16 causes the head of the bolt to be brought into pressure contact with step 14d and the forward end face of insertion hole 15a to be brought into pressure contact with step 14e of the forward end member. In this way, the forward end member is attached to the plunger body. Filler 17 made of a mixture of a ceramic filler and thermosetting resin is filled in a spacing which is defined around the head of bolt 16 and between the head of the bolt and the forward hole section of the forward end member. Filler 17, after being thermally cured, has its forward end face polished flat such that the end face is flush with the forward end face of the forward end member.

A preferable pot will be explained below in connection with the plunger so formed.

Figure 9:
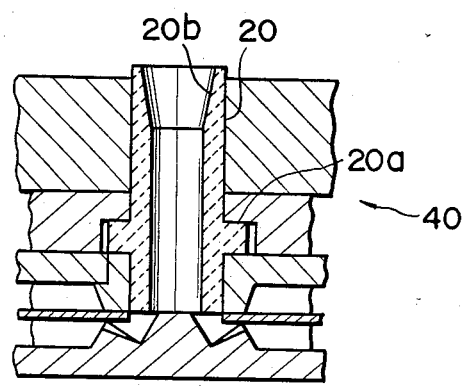

In FIG. 9, cylindrical pot 20 is wholly made of silicon nitride and has flange 20a on the outer periphery thereof. The pot is fixed to upper mold 40 by fitting the flange of the pot into a recess which is formed in the upper mold.

The pot has tapering section 20b at the upper inner wall section, through which the plunger is guided.

Figure 10:
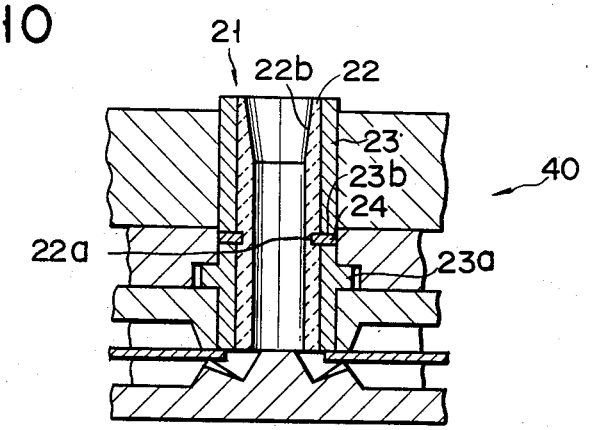

In FIG. 10, pot 21 has inner cylinder 22 made of silicon nitride and outer cylinder 23 made of a metal, noting that the outer cylinder is thermally shrunk on the inner cylinder to provide a unitary assembly. The outer cylinder has through hole 23b across the wall of the other cylinder which corresponds to recess 22a formed in the outer periphery of the inner cylinder. Locking pin 24 is inserted through the through hole into the recess, whereby the inner and outer cylinders are fixed against a vertical movement. Flange 23a is formed on the outer periphery of the outer cylinder and pot 21 is fixed to upper mold 40 with flange 23a fitted in a recess formed in the upper mold. Taper section 22b is formed at the upper inner wall of the inner cylinder and the plunger is guided through the taper section. Generally, a ceramics material is very hard, but readily breakable if it is thinner, and difficult to machine if it is intricate in configuration. The ceramic material has a smaller in linear expansion coefficient than the metal (for example, $3 \times 10^{-6}$ for silicon nitride) and, when used together with a metal at high temperature, cannot be positively fixed to the metal due to a clearance produced between the metal and the ceramic. This specific arrangement of the pot may eliminate the aforementioned drawbacks.

In FIG. 11, a pot is comprised of, as shown in FIG. 10, inner cylinder 26 made of silicon nitride and outer cylinder 27 made of a metal. The outer cylinder is thermally shrunk on the inner cylinder as in the case of the pot shown in FIG. 11 to provide an integral assembly. In the arrangement shown in FIG. 11, the inner cylinder is located in a position where the plunger is slidably moved and taper section 27b is formed on the outer cylinders to permit the plunger to be guided. By this specific arrangement the inner cylinder is simpler in configuration and easier to machine. In FIG. 11, like reference numerals are employed to designate parts or elements corresponding to those shown in FIG. 10.

In FIG. 12, a pot comprises inner cylinder 28 made of silicon nitride and outer cylinder 29 made of a metal. As in the case of the arrangement of FIG. 11, the inner cylinder is provided in a location where the plunger is slidably moved and taper section 29b is formed at the outer cylinder to permit the plunger to be guided. Unlike the arrangement shown in FIG. 11, externally threaded section 28a is formed on the outer periphery of the inner cylinder and internally threaded section 29a is formed on the inner wall of the outer cylinder 29. The outer cylinder is fixed to the inner cylinder by threadably inserting the externally threaded section of the inner cylinder into the internally threaded section of the outer cylinder. In this case, a thermosetting resin is coated on the threaded sections of the inner and outer cylinders. The externally threaded section of the inner cylinder is firmly fixed to the internally threaded section of the outer cylinder by thermally curing the thermosetting resin there. In FIG. 11, like reference numerals are employed to designate parts or elements corresponding to those shown in FIG. 10. Further explanation is therefore omitted for brevity.

Although, in the aforementioned pot, silicon carbide has been used, silicon nitride or zirconia may be used instead. Although, in these embodiments, the upper plunger type resin mold device has been used in connection with the pot incorporated in the upper metal, use can be made of the other multi-plunger type resin mold device, such as a lower plunger type resin mold device. FIG. 13 shows a state in which the pot of FIG. 9 is incorporated into the lower plunger type resin mold device. In FIG. 13, the pot of FIG. 9 is attached to lower mold 41 and the plunger as shown in connection with embodiment 1 is inserted from below the pot. Pocket 30 is formed above the forward end member and resin tablet 42 is inserted into pocket 30. Gate 43 is formed in the upper mold half. The upper and lower mold halves 40 and 41 are closed with lead frame 44 sandwiched therebetween and the plunger is moved upward to permit the resin to be transfer molded under compression.

According to the embodiments the following advantages are obtained since the forward end edge portion of the plunger which is brought into sliding contact with the inner wall surface of the pot is formed of at least one kind of material selected from the group consisting of silicon nitride, silicon carbide and zirconia.

(1) The use of the plunger according to the embodiments markedly lowers an amount of wear thereon. For this reason, the plunger exchange cycle becomes longer.

(2) There is no risk that a wider clearance will be produced between the plunger and the pot due to the filler present in the resin. This assures a high rate of operation and a consequent high yield, as well as a marked decrease in the running cost of the plunger.

(3) The sliding contact area of the plunger with respect to the pot better improves a wear-resistant characteristics and a clearance is difficult to produce between the pot and the plunger, resulting in a high rate of operation and thus a higher yield.

Although, in the aforementioned embodiment, the metal has been used as a material for the plunger body, any other material, such as ceramics, may be used instead.

What is claimed is:

1. In a plunger type resin molding device having a plunger slidably inserted into a pot to permit a resin in the pot to be supplied into a mold, the improvement comprising:
    at least one plunger having a forward end member with a forward end edge portion made of at least one kind of material selected from silicon nitride, silicon carbide and zirconia, at least said forward end edge portion of said forward end member being in contact with the resin in the pot; and
    a plunger body to which said forward end member is removably fixed.

2. An apparatus according to claim 1, wherein said forward end member has a protruding section provided opposite said forward end edge portion;
    said plunger body having, on a side facing said forward end member, a recess having a wall with an inner diameter substantially equal to an outer diameter of said protruding section, said forward end member being fixed to said plunger body by engagement between said protruding section of said forward end member and said recess wall of said plunger body.

3. An apparatus according to claim 2, wherein said plunger body has a hole reaching said recess from an outer periphery of said plunger body, said protruding section having a recess on an outer periphery thereof, said plunger body having a locking pin detachably inserted through said hole of said plunger body into said recess of said protruding section to firmly fix said forward end member to said plunger body.

4. An apparatus according to claim 1, wherein said forward end member has a protruding section extending in a direction opposite said forward end edge portion of said forward end member, said protruding section having an externally threaded section on an outer periphery of said protruding section;
    said plunger body having on a side facing said forward end member, a recess having an internally threaded section on an inner wall surface of said recess, said forward end member being fixed to said plunger body by threaded engagement between said protruding section of said forward end member and said internally threaded wall section of said recess of said plunger body.

5. An apparatus according to claim 4, wherein said plunger has a resin coating on the internally threaded section where said externally threaded section of said forward end member is threadably attached to said internally threaded section of said plunger body.

6. An apparatus according to claim 1, wherein said plunger body has a pair of semicircular sections divided along a plane of a center axis of said plunger body, each of said semicircular sections having a recess in one planar face opposing the recess in the planar face of the other of said semicircular sections, said forward end member having a protruding section extending in a direction opposite said forward end edge portion of said forward end member, said plunger having a transverse hole with a bolt and nut for engaging and tightening said semicircular sections relative to each other, said protruding section of said forward end member being attached to said plunger body by engagement between said protruding section of said forward end member and said semicircular sections of said plunger body.

7. An apparatus according to claim 1, wherein said forward end member has a configuration of a hollow tubular cylinder and has an intermediate step section having an inner diameter smaller than the inner diameter of the rest of the member, said plunger body having a protruding section projecting on one side thereof, said protruding section having an end with a recess having an internally threaded section on an internal wall thereof, said plunger having a bolt inserted from the forward end edge portion of said forward end member through the hollow portion of said tubular cylinder and into said recess for bringing a head of said bolt and said end of said protruding section into pressure contact with corresponding ends of said intermediate step section whereby said forward end member is fixed to said plunger body.

8. In a plunger type resin molding device having a plunger slidably inserted into a pot, of which the inner wall is formed of at least one material selected from the group consisting of silicon nitride, silicon carbide and zirconia, to permit a resin in the pot to be supplied into a mold, the improvement comprising:
    at least one plunger having a forward end member with a forward end edge portion made of at least one kind of material selected from silicon nitride, silicon carbide and zirconia, at least said forward end member being slidably inserted into said pot, and
    a plunger body to which said forward end member is removably fixed.

* * * * *